United States Patent [19]

Allen

[11] Patent Number: 5,495,776
[45] Date of Patent: Mar. 5, 1996

[54] CAM SHAFT TIMING ADJUSTMENT DEVICE

[75] Inventor: Timothy R. Allen, Lavaca, Ark.

[73] Assignee: Cloyes Gear & Products, Inc., Willoughby, Ohio

[21] Appl. No.: 146,528

[22] Filed: Nov. 1, 1993

[51] Int. Cl.⁶ .............................. F01L 1/34; F16H 35/06
[52] U.S. Cl. ........................................ 74/395; 123/90.15
[58] Field of Search ............................ 74/395, 397, 603, 74/595; 403/1, 13, 258; 123/90.15, 90.17, 90.6, 90.31

[56] References Cited

U.S. PATENT DOCUMENTS

| 1,691,408 | 11/1928 | Palmer . | |
| 3,369,418 | 2/1968 | Young | 74/395 |
| 3,369,436 | 2/1968 | Loase | 83/324 |
| 3,490,303 | 1/1970 | Rosenberg | 74/243 |
| 3,734,073 | 5/1973 | Walter et al. | 123/90.15 |
| 4,096,836 | 6/1978 | Kopich | 123/90.15 |
| 4,177,773 | 12/1979 | Cribbs | 123/90.15 |
| 4,532,822 | 8/1985 | Godlewski | 74/397 |
| 5,094,117 | 3/1992 | Mikel et al. | 74/395 |
| 5,181,432 | 1/1993 | Allen | 74/395 |

Primary Examiner—Charles A. Marmor
Assistant Examiner—Mary Ann Battista
Attorney, Agent, or Firm—Fay, Sharpe, Beall, Fagan, Minnich & McKee

[57] ABSTRACT

Apparatus for permitting selective adjustment of the angular position of a sprocket or gear relative to a driven shaft for changing the timing of an internal combustion engine includes a circular sprocket carried on an end face of the cam shaft in axial alignment with the shaft's axis of rotation. A first pin extends from the end face parallel to the axis of rotation at a location radially outwardly thereof through an enlarged opening in the sprocket. An adjusting plate is engaged with the sprocket on the side opposite the end face. The adjusting plate is positively engaged with the first pin with a second pin extending between the adjusting plate and the sprocket parallel to the axis of rotation but at a radial location different than the first pin such that angular adjustment of the adjusting plate about the axis of the first pin produces angular adjustment of the sprocket relative to the axis of rotation of the shaft.

15 Claims, 3 Drawing Sheets

CAM SHAFT TIMING ADJUSTMENT DEVICE

BACKGROUND OF THE INVENTION

The subject invention is directed toward the art of internal combustion engines and, more particularly, to an improved timing gear adjustment device.

In internal combustion engines, it is sometimes desirable or necessary to adjust the position of the cam shaft relative to the crankshaft to advance or retard the timing of the engine. Many different types of mechanisms have been proposed for accomplishing this adjustment. Typically, the mechanism 5 have included some type of adjustable connection between the cam shaft and the sprocket or gear through which it is driven by connection with the crankshaft. One such mechanism is shown in my prior U.S. Pat. No. 5,174,169, issued Dec. 29, 1992, for "Angularly Adjustable Timing Gear."

The mechanism shown in my noted patent is relatively simple to construct and generally can be easily incorporated into new engine designs or retro-fitted into existing engines. However, one currently available engine uses a cam shaft driven eccentric to drive the fuel pump, and this design presents special problems for the retro-fit of my prior adjustment mechanism.

BRIEF SUMMARY OF THE INVENTION

The subject invention provides an adjustment mechanism which can be readily incorporated into a wide range of new engine designs and easily retro-fitted into existing engines including those using cam shaft mounted eccentrics for fuel pump actuation.

More particularly, in accordance with one aspect of the invention, apparatus is provided for permitting selective adjustment of the angular position of a sprocket or gear relative to a driven shaft. The apparatus comprises a shaft mounted for rotation about an axis of rotation and having an end face in a plane perpendicular to the axis of rotation. Carried on the shaft end face is a circular sprocket member. A first pin extends from the end face parallel to the axis of rotation at a location radially outward thereof. The pin engages through an enlarged opening in the sprocket. Engaged with the sprocket on the side opposite the end face is an adjusting plate which is positively engaged with the first pin. At least one second pin extends between the adjusting plate and the sprocket parallel to the axis of rotation but at a radial location different than the first pin such that angular adjustment of the adjusting plate about the axis of the first pin produces angular adjustment of the sprocket relative to the axis of rotation of the shaft. Additionally, connecting means are provided for positively joining the sprocket and the adjusting plate in desired positions of relative angular adjustment.

Preferably, the connecting means for joining the sprocket and the shaft includes a bolt member which extends through the adjusting plate and the sprocket into threaded engagement with the shaft in axial alignment with the axis of rotation.

The adjusting plate itself can be incorporated in a separate drive train element. In the preferred embodiment, the adjusting plate is formed by the side of an eccentric which is carried on the sprocket and drives an associated fuel pump unit.

In accordance with a still further aspect of the invention, the first pin and the at least one second pin are in radial alignment relative to the axis of rotation of the shaft. Adjustment of the sprocket relative to the shaft takes place merely by releasing the threaded clamp bolt slightly so as to permit free angular relative rotation between the adjusting plate and the sprocket. Preferably, the sprocket and the adjusting plate are provided with indicia to show the adjustment which has been made. Thereafter, retightening of the clamp bolt places the components in operative driving condition.

As can be seen from the foregoing, the primary object of the invention is the provision of a highly simplified and easily adjustable apparatus for allowing the relative angular relationship between a shaft and a driven gear or sprocket to be changed.

A further object of the invention is the provision of an apparatus of the type described which can be readily incorporated into existing combustion engine designs for advancing or retarding engine timing.

Yet another object of the invention is the provision of an apparatus wherein an adjustable engine timing arrangement can be retro-fitted to existing engines with a minimum of change to existing components.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
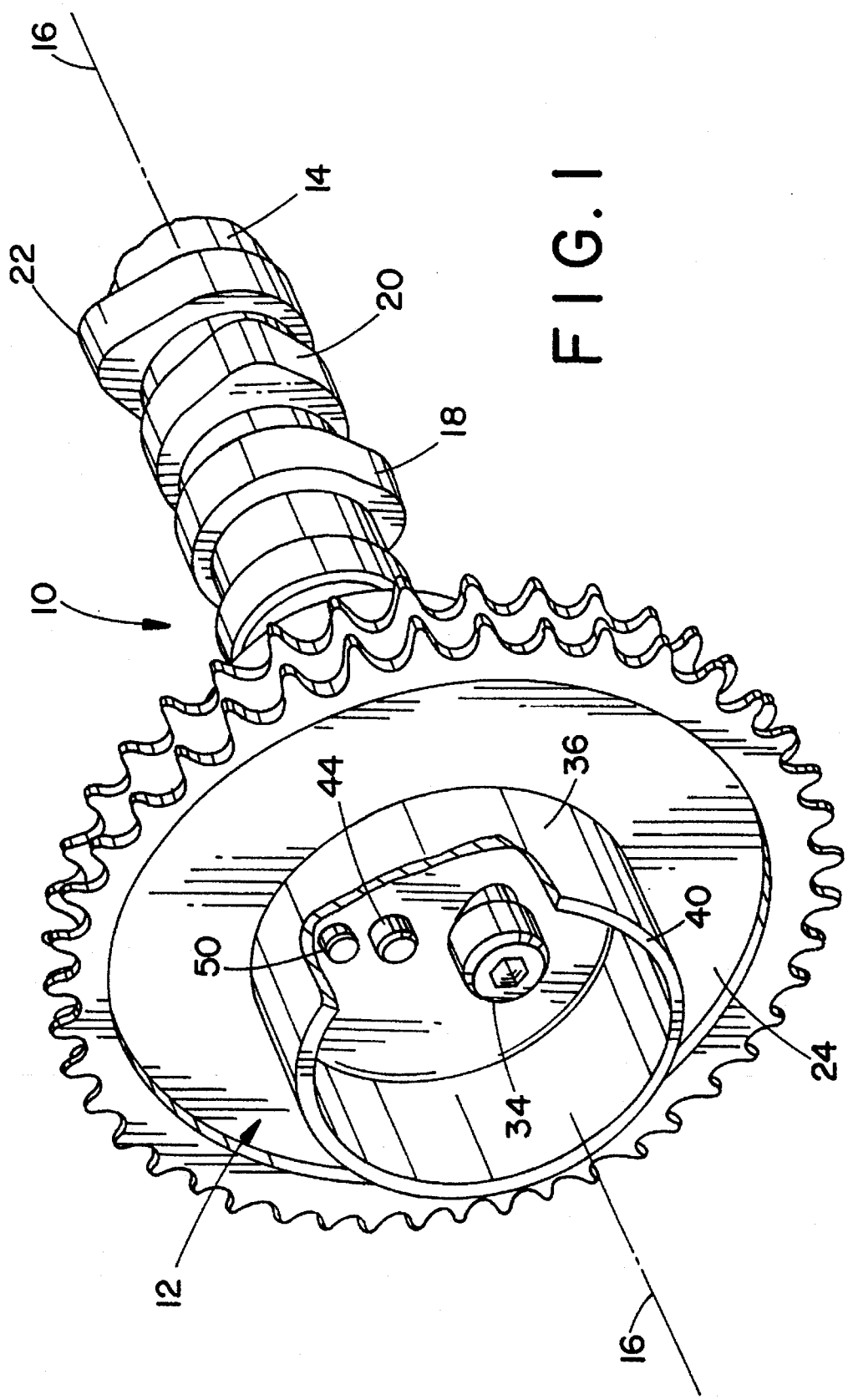
FIG. 1 is an isometric view of an internal combustion engine cam shaft provided with a timing adjustment mechanism formed in accordance with the subject invention.
Figure 2:
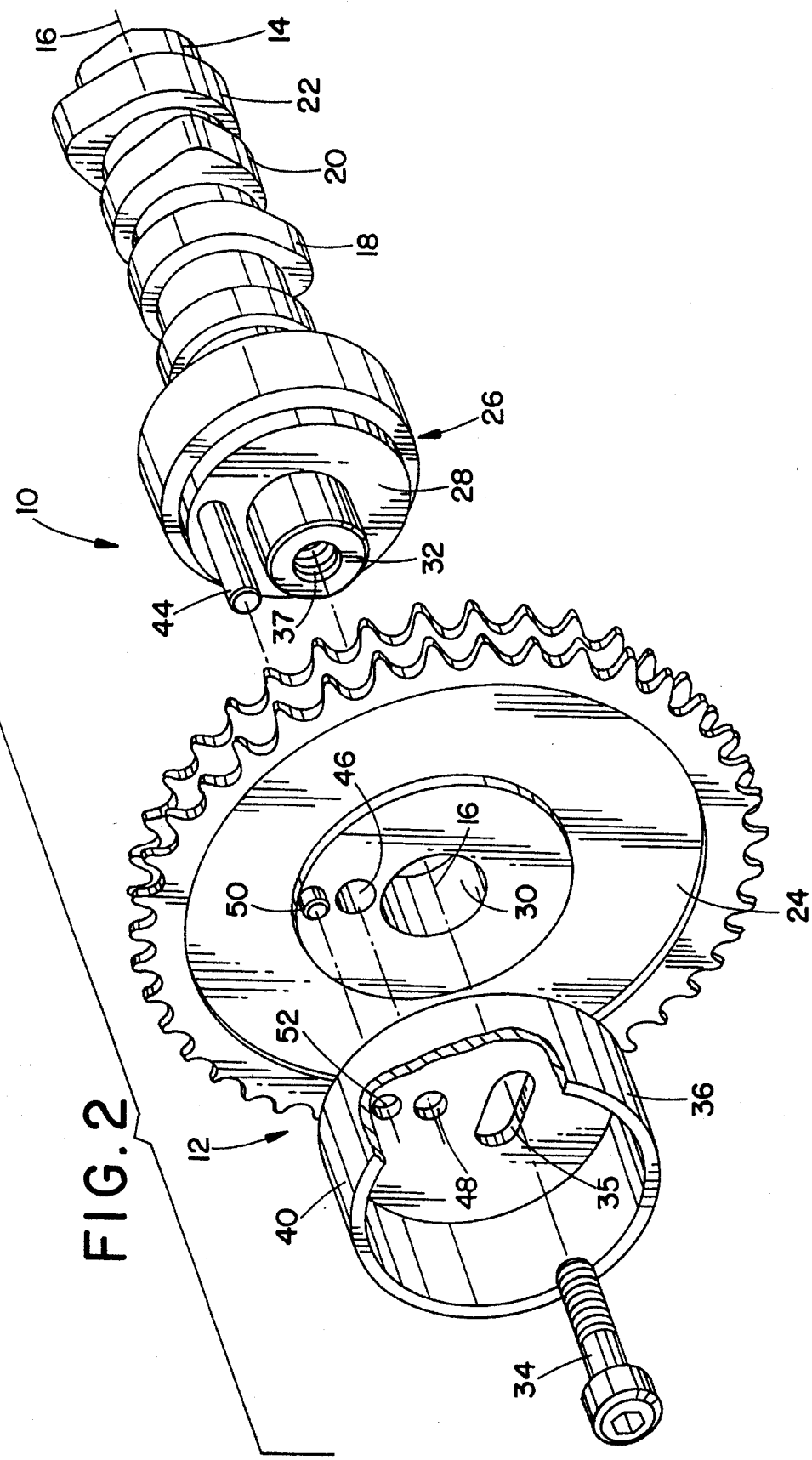
FIG. 2 is a view similar to FIG. 1 but showing the components in their exploded, disassembled relationship.

Referring more particularly to the drawings wherein the showings are for the purpose of illustrating a preferred embodiment of the invention only, and not for the purpose of limiting same, FIGS. 1 and 2 show the overall arrangement of an internal combustion engine cam shaft and drive sprocket assembly 10 which is provided with an adjustment mechanism 12 formed in accordance with the subject invention. In the preferred embodiment, the cam shaft 14 is mounted for driven rotation about its longitudinally extending axis 16. The cam shaft 14 is provided with the usual series of cams 18, 20, and 22. As is understood, the cams 18, 20, and 22 act upon rotation of the cam shaft to actuate the engine intake and exhaust valves in timed relationship with the engine crankshaft. Driving of the cam shaft is accomplished through the sprocket member 24 which is positively connected to the enlarged and flanged end 26. The sprocket is, of course, drivingly connected with the crankshaft through a timing chain (not shown) so that the movement of the cam shaft is directly related to the movement of the crankshaft. Although the item 24 has been described and shown as a sprocket, it should be understood that for the purposes of the subject invention and application, the term sprocket could equally well be considered as encompassing a gear and a direct gear connection as opposed to a sprocket/chain type connection between the cam shaft and the crankshaft.

Referring again to the relationship between the sprocket 24 and the shaft 14, it will be noted that the sprocket 24 is received on the end face 28 of the enlarged end 26, and the sprocket includes a central opening 30 which is sized so as to be closely received on the circular stub 32 which extends from the end face 28 in alignment with the axis of rotation 16.

In the subject embodiment, the sprocket 24 is positively joined to the cam shaft 14 by being suitably clamped thereto by a machine bolt 34 that extends through openings 35 and 30 into a threaded opening 37 formed inwardly from the outer end of mounting stub 32. The threaded bolt 34 is shown as a socket head machine bolt and passes through a member 36 which acts to clamp against the sprocket 24 and maintain it firmly fixed relative to end face 28. In the subject embodiment, the member 36 is a cam in the form of a cylindrical cup-shaped member which is eccentrically joined to the sprocket 24 and acts as an eccentric to drive an associated fuel pump. In the subject invention, the eccentric 36 serves as an adjusting plate portion of the adjusting mechanism 12. It will become apparent that the fact that it is shown as an eccentric is not particularly material to the invention.

It is sometimes desirable or necessary to change the timing of an engine. This timing change is referred to as advancing or retarding the timing and is produced in the subject arrangement by changing the relative angular positions of the cam shaft and the crankshaft. More particularly, in the subject invention, timing is changed by varying the angular position of the sprocket 24 relative to the cam shaft 14. This, of course, changes the effective position of the cam shaft relative to the crankshaft.

Figure 3:
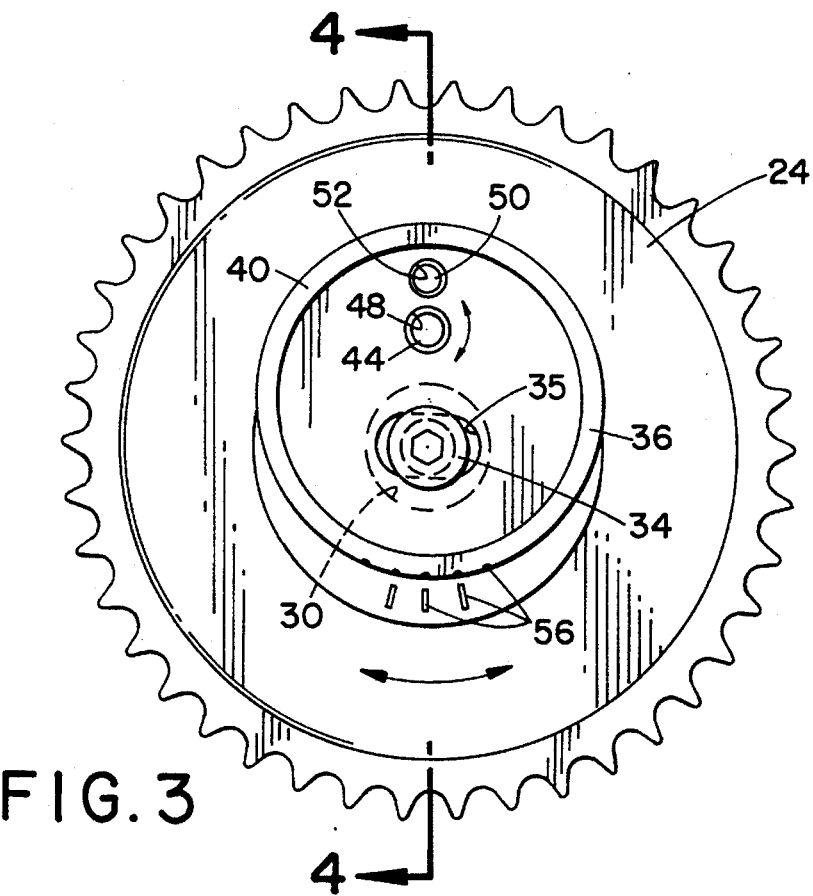
FIG. 3 is an end view looking toward the face of the sprocket opposite the cam shaft; and, FIG. 4 is a cross-sectional view taken on lines 4—4 of FIG. 3.
Figure 4:
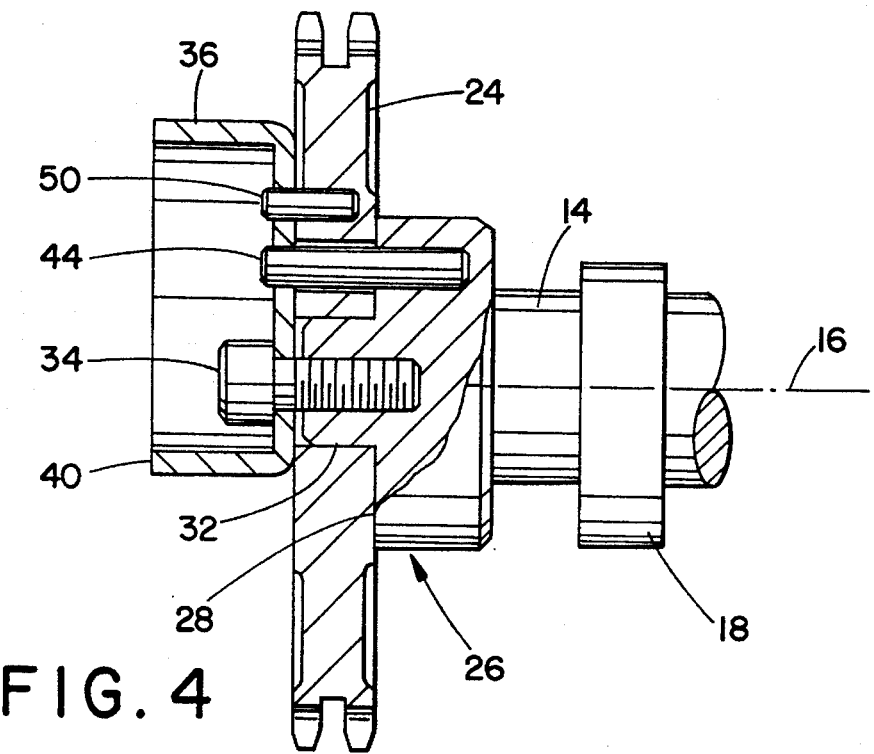

According to the subject invention, an extremely simple and effective arrangement is provided for allowing this adjustment to be carried out. In particular, it will be noted that, as best shown in FIGS. 2 through 4, there is a first pin member 44 that extends outwardly from the end face 28 of shaft 14 at a position radially outward from the axis 16 and parallel thereto. The pin 44 is, in the subject embodiment, positively joined into the end face 28 of the enlarged end portion 26. It extends loosely through an enlarged hole 46 in the sprocket 24 and is received in and engaged in a closely fitting hole 48 formed in the eccentric 36. A second pin 50 is carried in the sprocket 24 at a location radially outward of the pin 44. Pin 50 is likewise arranged so as to extend parallel to the axis of rotation 16. Pin 50 extends outwardly through a close fitting opening 52 in the bottom wall of eccentric 36. The previously mentioned opening 35 in the bottom wall of eccentric 36 is in the nature of an elongated slot as best seen in FIG. 2 and 3. Opening 35 is sized and arranged to allow at least limited arcuate oscillation of eccentric 36 about pin 44 for adjustment purposes. When the bolt 34 is loosened, it is possible to rock or rotate the eccentric 36 about the pin 44 as depicted in FIG. 3. This causes pin 50 to be driven to move and adjust the angular position of sprocket 24 relative to shaft 14. Thus, carefully controlled adjustments in the angular relationships can be made. Additionally, it should be appreciated that various indicia 56 or markings can be stamped or otherwise placed on the eccentric 36 and/or the sprocket 24 to aid in the positioning and adjustment of the components. For the purposes of the subject invention, the eccentric 36 acts as an adjustment plate for the mechanism. It should be appreciated, however, that in other environments, the adjustment plate could be a simple flat plate having the suitable openings placed therein.

After adjustment is completed, tightening of the bolt 34 clamps the eccentric 36 and the sprocket 24 into driving engagement with the shaft 14 and holds them in their desired positions of adjustment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus comprising:

a shaft having an axis of rotation and an end face in a plane perpendicular to the axis of rotation;

a cylindrical mounting stub extending from the end face in axial alignment with the axis of rotation;

a circular sprocket carried on the mounting stub with the mounting stub extending axially into the sprocket;

a first pin extending from said end face parallel to the axis of rotation at a location radially outwardly thereof, said first pin extending through an enlarged opening in the sprocket;

an adjusting plate engaged with the sprocket on the side of the sprocket opposite the end face, the adjusting plate positively engaged with the first pin with at least one second pin extending between the adjusting plate and the sprocket parallel to the axis of rotation but at a radial location different than the first pin, the adjusting plate being pivotal about the first Din to produce driven movement of the sprocket on the mounting stub such that angular adjustment of the adjusting plate about the axis of the first pin produces angular adjustment of the sprocket relative to the axis of rotation of the shaft; and, connecting means for releasably clamping the sprocket and the adjusting plate in desired positions of angular adjustment.

2. The apparatus as defined in claim 1 wherein the first pin is fixed in the end face and closely but freely received in an opening in the adjusting plate.

3. The apparatus as defined in claim 1 wherein the at least one second pin is at a location radially outward of the first pin relative to the axis of rotation.

4. The apparatus as defined in claim 1 wherein the adjusting plate is an eccentric driven by the sprocket.

5. The apparatus as defined in claim 4 wherein the connecting means includes a bolt extending through the eccentric and the sprocket into a threaded opening in the end face to selectively clamp the eccentric and the sprocket to the end face.

6. The apparatus as defined in claim 1 wherein the connecting means includes a member threadedly engaged with the shaft.

7. The apparatus as defined in claim 6 wherein the member threadedly engaged with the shaft comprises a bolt extending into a threaded opening in the said end face.

8. The apparatus as defined in claim 7 wherein the bolt extends through an opening in the adjusting plate.

9. Apparatus comprising:

a shaft having an axis of rotation and an end face in a plane perpendicular to the axis of rotation;

a circular sprocket carried on the end face in axial alignment with the axis of rotation;

a first pin extending from said end face parallel to the axis of rotation at a location radially outwardly thereof, said first pin extending through an enlarged opening in the sprocket;

an adjusting plate engaged with the sprocket on the side of the sprocket opposite the end face, the adjusting plate positively engaged with the first pin with at least one second pin extending between the adjusting plate and the sprocket parallel to the axis of rotation but at a radial location different than the first pin such that angular adjustment of the adjusting plate about the axis of the first pin produces angular adjustment of the sprocket relative to the axis of rotation of the shaft; and, connecting means including means aligned with the axis of rotation for holding the sprocket and the adjusting plate connected to the shaft during angular adjustment of the adjusting plate and operable to clamp the sprocket and the adjusting plate to the end face in desired positions of angular adjustment.

10. The apparatus as defined in claim 9 wherein the first pin is fixed in the end face.

11. The apparatus as defined in claim 9 wherein the at least one second pin is at a location radially outward of the first pin relative to the axis of rotation.

12. The apparatus as defined in claim 9 wherein the connecting means includes a member threadedly engaged with the shaft.

13. The apparatus as defined in claim 12 wherein the connecting means includes a bolt extending through the eccentric and the sprocket into a threaded opening in the end face to selectively clamp the eccentric and the sprocket to the end face.

14. The apparatus as defined in claim 12 wherein the member threadedly engaged with the shaft comprises a bolt that releasably clamps the adjusting plate to the end face.

15. The apparatus as defined in claim 14 wherein the bolt extends through an opening in the adjusting plate and includes a head portion that engages the adjusting plate.

\* \* \* \* \*